(12) United States Patent
White et al.

(10) Patent No.: US 10,220,773 B2
(45) Date of Patent: Mar. 5, 2019

(54) WINDSHIELD BLACKOUT WITH VIEWING WINDOW AND BLACKOUT WINDOW FEATURE

(71) Applicant: FORD GLOBAL TECHNOLOGIES, LLC, Dearborn, MI (US)

(72) Inventors: John Quintin White, Livonia, MI (US); Bradley Berner, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/651,705

(22) Filed: Jul. 17, 2017

(65) Prior Publication Data

US 2019/0016260 A1    Jan. 17, 2019

(51) Int. Cl.
| | |
|---|---|
| *B60Q 3/208* | (2017.01) |
| *G09F 21/04* | (2006.01) |
| *G09F 13/04* | (2006.01) |
| *G09F 13/02* | (2006.01) |
| *G09F 13/06* | (2006.01) |
| *B60Q 3/70* | (2017.01) |
| *B60J 3/04* | (2006.01) |
| *H02S 99/00* | (2014.01) |

(52) U.S. Cl.
CPC .............. *B60Q 3/208* (2017.02); *B60J 3/04* (2013.01); *B60Q 3/70* (2017.02); *G09F 13/02* (2013.01); *G09F 13/04* (2013.01); *G09F 13/06* (2013.01); *G09F 21/04* (2013.01); *G09F 2013/044* (2013.01); *H02S 99/00* (2013.01)

(58) Field of Classification Search
CPC ........... B60Q 3/208; B60Q 3/70; G09F 21/04; G09F 2013/044
See application file for complete search history.

(56) References Cited

U.S. PATENT DOCUMENTS

| | | |
|---|---|---|
| 5,124,845 A | 6/1992 | Shimojo |
| 7,036,965 B2 | 5/2006 | Dalton, Jr. et al. |
| 8,840,288 B2 | 9/2014 | Plavetich et al. |
| 2005/0016955 A1* | 1/2005 | DeRossett, Jr. ...... C03C 23/0025 216/65 |
| 2005/0157513 A1 | 7/2005 | Alexander et al. |
| 2014/0270385 A1* | 9/2014 | Nepomniachtchi .... G06K 9/344 382/104 |
| 2016/0303831 A1* | 10/2016 | Cloots ..................... B32B 37/06 |

FOREIGN PATENT DOCUMENTS

| | | |
|---|---|---|
| CN | 103171409 A | 6/2013 |
| CN | 103777352 A | 5/2014 |
| GB | 2178583 A | 2/1987 |
| GB | 2347004 A | 8/2000 |

OTHER PUBLICATIONS

"Worth Data," https://web.archive.org/web/20150215130017/http://www.barcodehq.com:80/vinbarcode.html, Feb. 15, 2015. (Year: 2015).*
English Machine Translation of CN103171409A.
English Machine Translation of CN103777352A.

* cited by examiner

*Primary Examiner* — Gary C Hoge
(74) *Attorney, Agent, or Firm* — Vichit Chea; King & Schickli, PLLC

(57) ABSTRACT

An apparatus includes a windshield blackout between a bottom of the windshield and a top of the instrument panel, a viewing window provided in the windshield blackout and a blackout window feature provided behind the viewing window.

5 Claims, 6 Drawing Sheets

WINDSHIELD BLACKOUT WITH VIEWING WINDOW AND BLACKOUT WINDOW FEATURE

TECHNICAL FIELD

This document relates generally to the motor vehicle equipment field and, more particularly, to a new and improved apparatus comprising a windshield blackout, a viewing window provided in the windshield blackout and a blackout window feature provided behind the viewing window.

BACKGROUND

The design and architecture of some new electric vehicles causes a relatively wide disconnect between the bottom of the windshield and the top of the instrument panel at the interior of the motor vehicle. As a result, the windshield includes a relatively tall windshield blackout as an aesthetic element to block or conceal the view into the area above the cowl and below the top of the instrument panel.

Many individuals do not find such a tall or wide windshield blackout aesthetically appealing. This document relates to a new and improved apparatus for enhancing the aesthetic appearance of the tall or wide blackout area characteristic of many new electric vehicles.

SUMMARY

In accordance with the purposes and benefits described herein, a new and improved apparatus is provided. That apparatus comprises a windshield blackout, a viewing window provided in the windshield blackout and a blackout window feature provided behind the viewing window.

The blackout window feature may comprise a number of different structures. In one possible embodiment, the blackout window feature may be an illuminated message board. In another possible embodiment, the blackout window feature may be fanned LED lighting. That fanned LED lighting may be utilized to light the under hood area of the motor vehicle when the hood is opened so as to allow one to see the forward storage area under the hood in the absence of ambient lighting.

In yet another possible embodiment, the blackout window feature is a switchable effect branding device. In still another possible embodiment, the blackout window feature is an ornamental device. That ornamental device may be illuminated by a light source. In one of many possible embodiments, the ornamental device is illuminated by a light source positioned in front of and below the ornamental device but behind the windshield blackout where the light source is hidden from view. In another possible embodiment, the ornamental device is back illuminated by a light source behind the ornamental device.

In yet another possible embodiment, the blackout window feature is a solar panel. That solar panel may be used to collect solar energy to charge the battery of the electric vehicle or provide electric power to electrical devices on board the motor vehicle.

In still other possible embodiments, the blackout window feature is an electronic display device. In still other possible embodiments, the viewing window comprises a laser etched image in the windshield blackout. In such an embodiment the blackout window feature comprises a light source for backlighting the laser etched image.

The blackout window may be a ceramic film applied to the windshield. Still further, the blackout window may be a ceramic paint applied to the windshield.

In the following description, there are shown and described several preferred embodiments of the apparatus. As it should be realized, the apparatus is capable of other, different embodiments and its several details are capable of modification in various, obvious aspects all without departing from the apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and together with the description serve to explain certain principles thereof.

Reference will now be made in detail to the present preferred embodiments of the apparatus, examples of which are illustrated in the accompanying drawing figures.

DETAILED DESCRIPTION

Figure 1:
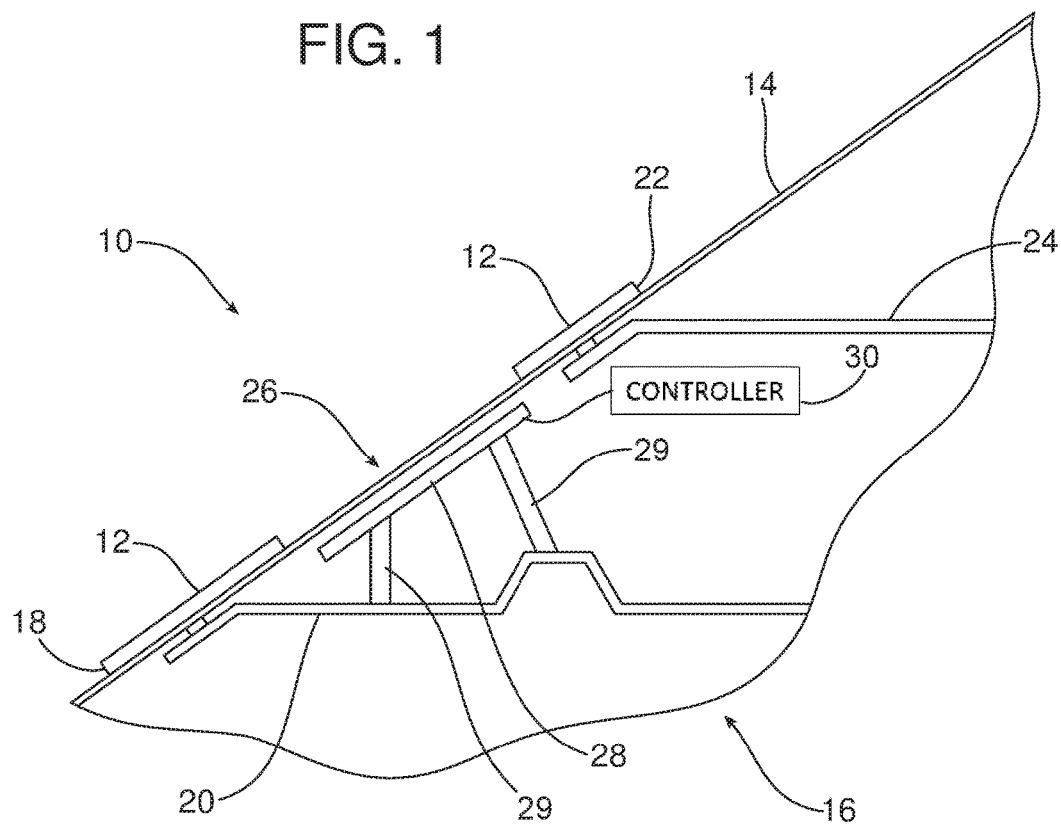
FIG. 1 is a schematic cross sectional view illustrating a first possible embodiment of the apparatus including a windshield blackout, a viewing window provided in the windshield blackout and a blackout window feature provided behind the viewing window.

Reference is now made to FIG. 1 illustrating a first embodiment of the apparatus 10. As illustrated, that first embodiment includes a windshield blackout 12 that extends across the lower portion of the windshield 14 of the motor vehicle 16. In the illustrated embodiment, the windshield blackout 12 includes a lower limit or edge 18 that extends below the cowl 20 and an upper limit or edge 22 that extends above the top of the instrument panel 24.

A viewing window 26 is provided along an intermediate portion of the windshield blackout 12 between the lower edge 18 and the upper edge 22. Here it should be appreciated that the windshield blackout 12 conceals from view the interior area of the motor vehicle between the cowl 20 and the instrument panel 24 except where the viewing window 26 is located.

A blackout window feature 28 is provided behind the viewing window 26. That blackout window feature 28 may be viewed through the windshield 14 at the viewing window 26. In the illustrated embodiment, the blackout window feature 28 is supported in position behind the viewing window 26 by support struts 29 anchored to the cowl 20.

The blackout window feature 28 may comprise a number of different structures. For example, in the FIG. 1 embodiment, the blackout window feature 28 may comprise an illuminated message board or an electronic display device. Such a message board or electronic display device may be utilized for a number of different purposes. For example, the illuminated message board or electronic display device may indicate the brand of the motor vehicle 16. In other, alternative embodiments, the illuminated message board or electronic display device may provide advertising for the company that owns the motor vehicle. In still other embodiments, the illuminated message board or electronic display device may be connected to a controller 30 of a type known in the art to allow one to enter personal messages for display on the illuminated message board or electronic display device. Such a controller 30 may take the form of a computing device such as a dedicated microprocessor or electronic control unit (ECU) operating in accordance with instructions from appropriate control software. Thus, the controller 30 may include one or more processors, one or more memories and one or more network interfaces all in communication with each other over a communication bus. In one possible embodiment, the controller 30 may include a voice processor and thereby be responsive to voice commands.

The embodiment of the apparatus 10 illustrated in FIG. 2, like the first embodiment of the apparatus illustrated in FIG. 1, includes a windshield blackout 12 provided on a windshield 14 and extending from below the cowl 20 to above the instrument panel 24. The windshield blackout 12 includes a viewing window 26 provided between the lower edge 18 and upper edge 22 of the windshield blackout.

Figure 2:
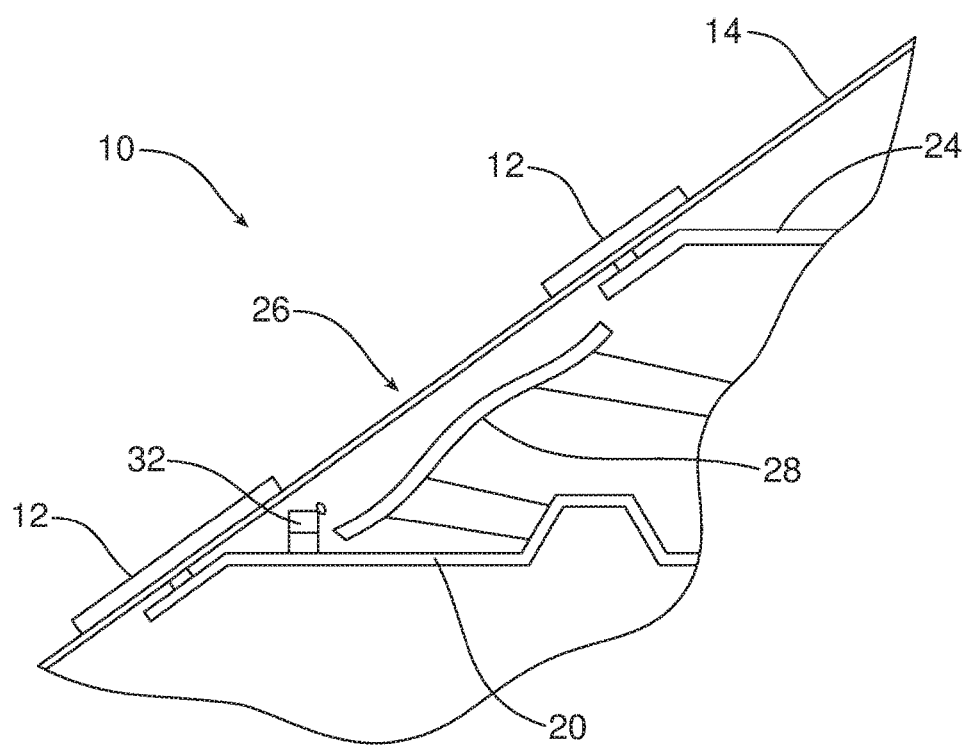
FIG. 2 is an illustration similar to FIG. 1 but showing a second possible embodiment of the apparatus.

In the FIG. 2 embodiment of the apparatus 10, the blackout window feature 28 comprises an ornamental device such as a company logo or a randomly selected image or art work. The ornamental device/blackout window feature 28 may be illuminated by a light source 32. In the embodiment illustrated in FIG. 2, that light source is positioned in front of and below the ornamental device 28. More specifically, in the illustrated embodiment, the light source 32 is mounted on the cowl 20 and is concealed or hidden from view by the lower portion of the windshield blackout 12.

Figure 3:
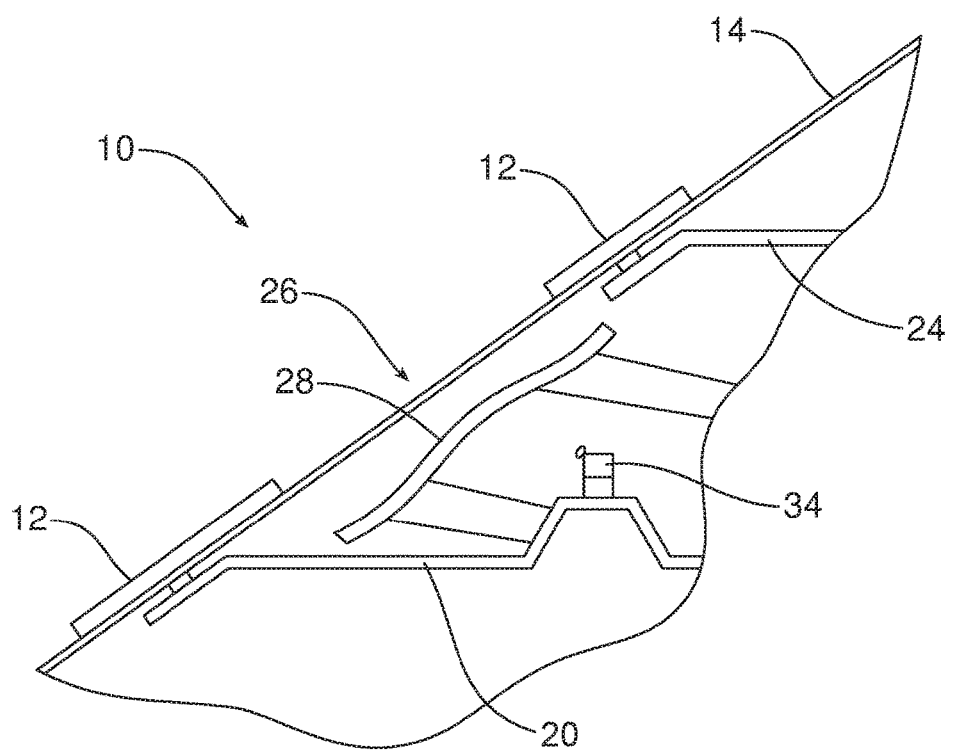
FIG. 3 is an illustration similar to FIGS. 1 and 2 but showing a third possible embodiment of the apparatus.

In the embodiment illustrated in FIG. 3, the ornamental device/blackout window feature 28 is back illuminated by the light source 34. That light source 34 is mounted on the cowl 20 behind the ornamental device/blackout window feature 28. In such an embodiment, the backlighting may be transmitted through the ornamental device/blackout window feature 28 where openings or translucent or transparent sections are provided. This can create a visually stimulating and aesthetically pleasing effect that enhances the look of the motor vehicle compared to a tall or wide, uninterrupted windshield blackout without a viewing window 26 for the presentation of such an ornamental device.

Figure 4:
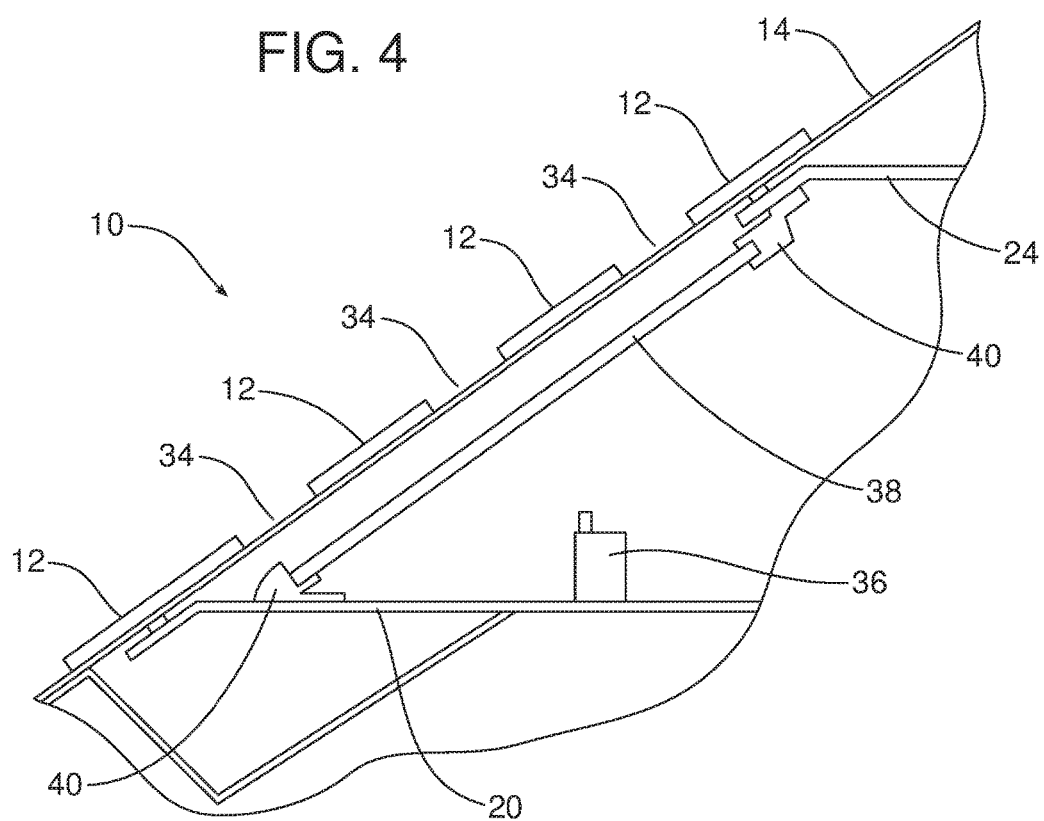
FIG. 4 is a view similar to FIG. 3 but showing a fourth possible embodiment of the apparatus.

FIG. 4 illustrates yet another possible embodiment of the apparatus 10. In the embodiment of the apparatus 10 illustrated in FIG. 4, the viewing window comprises a laser etched image 34. In the embodiment illustrated in FIG. 4, that laser etched image 34 is backlit by means of a blackout window feature in the form of a light source 36 carried on the cowl 20. A light diffusion panel 38 may be provided between the light source 36 and the laser etched image 34 in order to provide diffused light projecting through the laser etched image so as to provide an evenly lit image when viewed from the front, exterior to the motor vehicle. As illustrated, the light diffusion panel 38 may be held in a bracket 40 connected to the cowl 20 and the instrument panel 24.

Figure 5:
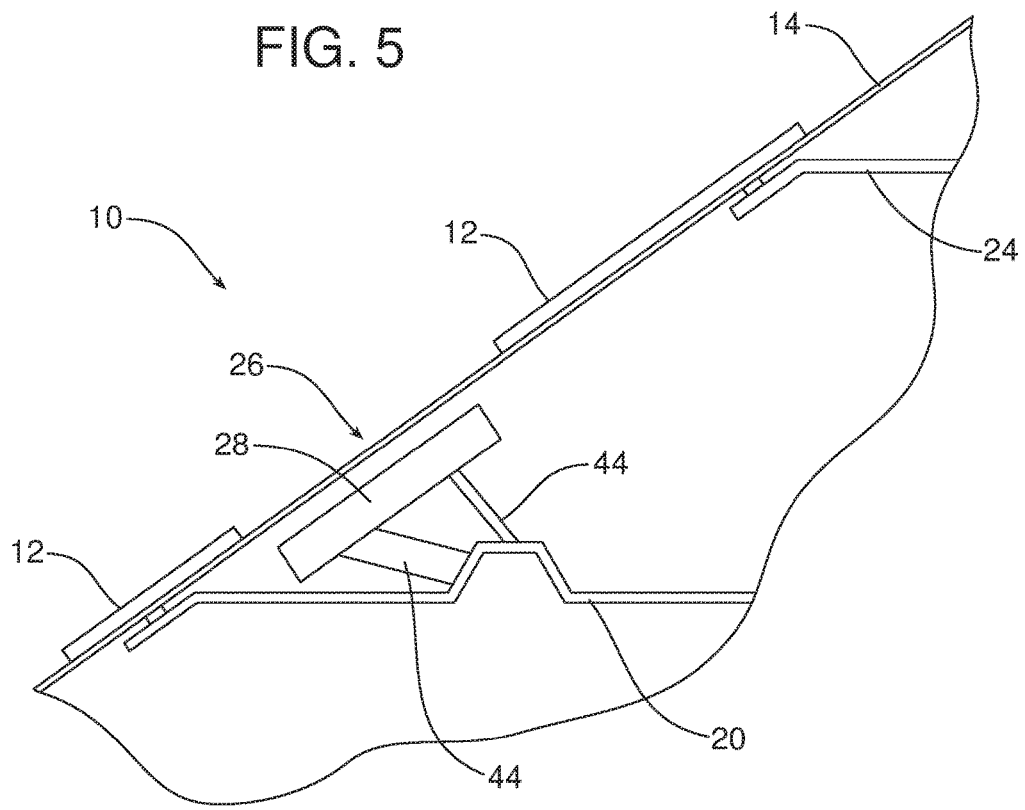
FIG. 5 is a view similar to FIGS. 1-4 but illustrating a fifth possible embodiment of the apparatus.

FIG. 5 illustrates yet another possible embodiment of the apparatus 10. In the FIG. 5 embodiment, the blackout window feature 28 comprises a solar panel secured behind the viewing window 26 on struts 44 connected to the cowl 20. As should be appreciated, the solar panel 28 is provided at an inclined angle that is particularly effective in collecting solar energy which may be used to power electrical components of the motor vehicle and/or charge one or more batteries of the motor vehicle. Advantageously, the solar panel/blackout window feature 28 may be provided in an aesthetically pleasing manner without in any way degrading the aesthetic appearance and smooth aerodynamic shape of the motor vehicle.

Figure 6:
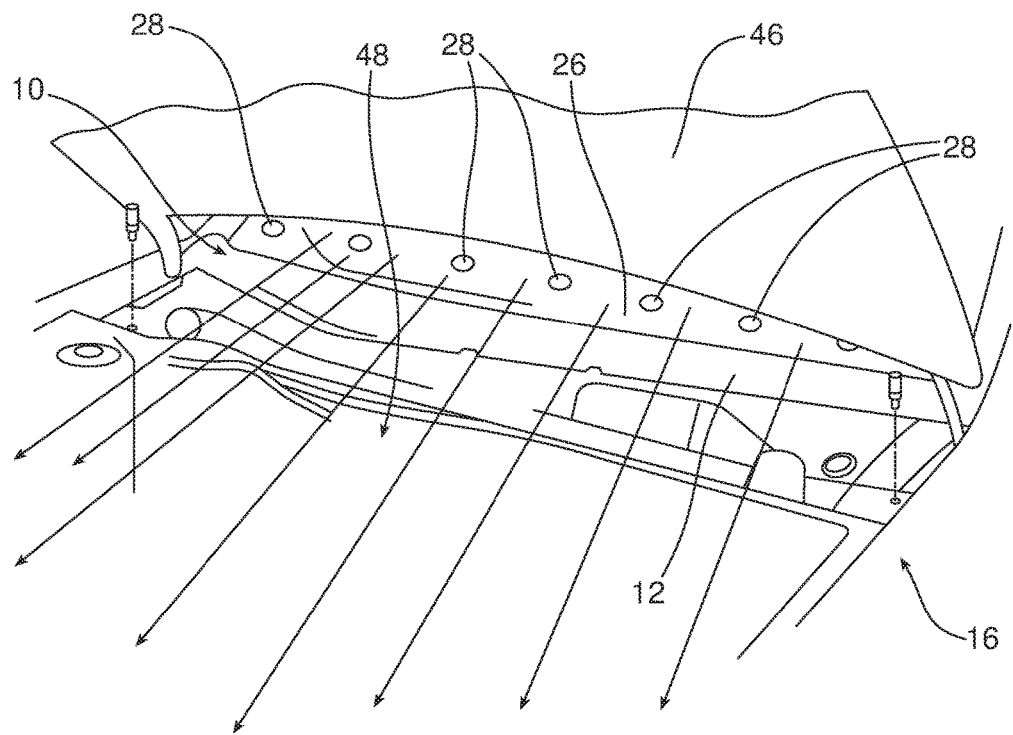
FIG. 6 is a front perspective view of a motor vehicle illustrating a sixth possible embodiment of the apparatus (fanned LED lighting illuminating the storage compartment under the open hood).

Reference is now made to FIG. 6 illustrating yet another possible embodiment of the apparatus 10. FIG. 6 illustrates the motor vehicle 16 with the hood 46 open so as to access the storage space 48 at the front of the motor vehicle. In this embodiment, the blackout window feature 28 comprises fanned LED lighting in the form of an LED array adapted to illuminate the storage area 48 when the hood 46 is opened (note action arrows). As should be appreciated, the illumination from the LEDs/blackout window feature 28 passes through the viewing window 26 above the lower portion of the windshield blackout 12 into the storage compartment 48 thereby allowing a motor vehicle operator to view objects in the storage compartment even under low ambient light conditions such as found at night, in a parking garage or under other circumstances.

In any of the embodiments illustrated in FIGS. 1-6, the windshield blackout 12 may be a ceramic film applied to the windshield 14. Similarly, in any of the embodiments illustrated in FIGS. 1-6, the windshield blackout 12 may be a ceramic paint applied to the windshield 14. These are just two possible approaches for providing the windshield blackout 12 on the windshield 14 and should not be considered as limiting in scope. It should also be noted that the drawing figures are not to scale and that the windshield blackout 12 may actually be a very thin layer, much thinner than the thickness of the windshield 14. The thickness of the windshield blackout 12 utilized in the drawing figures is pronounced for purposes of illustration and should not be considered in any way as limiting in scope.

The foregoing has been presented for purposes of illustration and description. It is not intended to be exhaustive or to limit the embodiments to the precise form disclosed. Obvious modifications and variations are possible in light of the above teachings. For example, a light source for lighting the blackout window feature 28 may be provided forward of and above the feature rather than forward and below or behind the feature as illustrated in FIGS. 2 and 3 respectively.

In addition, the blackout window feature 28 may comprise a switchable effect branding device. Such a device may, for example, switch back and forth between two or more images of a running mustang or present any other desired "action" figure or image. In fact, any form of a switchable effect image or message may be provided as desired. Further, the controller 30 may be utilized to program the blackout window feature 28 to produce any number of different visual effects including switchable effects for branding or other purposes. All such modifications and variations are within the scope of the appended claims when interpreted in accordance with the breadth to which they are fairly, legally and equitably entitled.

What is claimed:
1. An apparatus, comprising:
a windshield blackout;
a viewing window provided in said windshield blackout;

an ornamental device provided behind said viewing window; and a light source behind said ornamental device to back illuminate said ornamental device.

2. The apparatus of claim 1, wherein said windshield blackout is a ceramic film applied to said windshield.

3. The apparatus of claim 1, wherein said windshield blackout is a ceramic paint applied to said windshield.

4. An apparatus, comprising:

a windshield blackout;

a viewing window provided in said windshield blackout;

a laser etched image provided in said windshield blackout; and a blackout window feature provided behind said viewing window.

5. The apparatus of claim 4, wherein said blackout window feature comprises a light source for backlighting said laser etched image.

\* \* \* \* \*